United States Patent
Schlotterbeck et al.

[15] 3,698,204
[45] Oct. 17, 1972

[54] ELECTRONIC CONTROLLER FOR AUTOMOTIVE AIR CONDITIONING SYSTEM

[72] Inventors: David L. Schlotterbeck; John R. Briar, both of Dayton, Ohio

[73] Assignee: General Motors Corporation, Detroit, Mich.

[22] Filed: June 16, 1971

[21] Appl. No.: 153,736

[52] U.S. Cl. .................62/206, 62/212, 62/217, 62/225
[51] Int. Cl. .............................................F25b 41/00
[58] Field of Search........62/212, 224, 225, 217, 204, 62/205, 206, 209

[56] References Cited

UNITED STATES PATENTS

| | | |
|---|---|---|
| 2,759,674 | 8/1956 | Jorgensen....................62/217 |
| 3,121,315 | 2/1964 | Matthies......................62/217 |
| 3,478,534 | 11/1969 | Matthies......................62/225 |
| 3,640,086 | 2/1972 | Brody..........................62/210 |

*Primary Examiner*—Meyer Perlin
*Attorney*—W. S. Pettigrew et al.

[57] ABSTRACT

An automotive air conditioning system including a compressor, a condenser and an evaporator core over which air is directed and cooled for return to the passenger compartment of the car. The evaporator core is maintained at approximately 32° F. by the combined control of an expansion valve between the condenser and evaporator and a suction throttling valve between the evaporator and the inlet of the compressor. The expansion valve is controlled in response to the temperature of the outlet pipe of the evaporator core and the temperature of the outlet pipe from the suction throttling valve and the flow of refrigerant is metered through the valve to keep the core full of liquid refrigerant to assure maximum cooling efficiency. The suction throttling valve is controlled by sensing the temperature of the outlet pipe from the evaporator core and controlling a throttling piston by means of a transducer for converting electrical energy into mechanical movement of the throttling piston to maintain an evaporator pressure at a constant pressure of 29.5 psi plus or minus 0.5 psi to maintain tubes and fins of the evaporator core at approximately 32° F.

5 Claims, 5 Drawing Figures

INVENTORS.
David L. Schlotterbeck &
BY John R. Briar
J.C. Evans
ATTORNEY

ELECTRONIC CONTROLLER FOR AUTOMOTIVE AIR CONDITIONING SYSTEM

This invention relates to automotive air conditioning system for preventing the buildup of ice on an evaporator core, and more particularly to such systems which have an expansion valve for regulating the amount of liquid flow into the evaporator and a throttling valve for controlling the pressure within the evaporator to compensate for both changes in heat load on the evaporator and changes in speed of operation of an engine driven compressor in the system.

In automotive air conditioning systems a refrigerant compressor is driven from the crankshaft pulley at variable speeds dependent upon engine operation.

Additionally, such systems are operated over a wide range of ambient conditions which can require a greater or lesser amount of liquid refrigerant flow to the evaporator to adequately cool air being delivered into the passenger compartment of the automobile.

In order to prevent buildup of ice on the evaporator and a consequent reduction of air flow thereacross into the passenger compartment, it is desirable to include control components in the system that will maintain conditions in the evaporator at approximately 32° F. taking into account both changes in the speed of operation of the compressor and the heat load on the evaporator.

One approach has been to provide a thermally responsive device for cycling the compressor on and off during air conditioning system operation to prevent the tube and fins of the evaporator core from falling below 32° F.

Another approach to controlling the operation of automotive air conditioning systems is to include an expansion valve between a liquid receiver in the system and the evaporator to control the flow of refrigerant to the evaporator core by sensing the temperature of the outlet pipe of the core through use of a pressurized, temperature sensitive bulb clamped to the outlet pipe and by sensing the pressure at the exit of the evaporator through a pressure equalizer line connected to the suction throttling valve. Such a valve meters the flow of refrigerant to the core in response to these combined pressure and temperature signals to maintain the core full of low pressure liquid and vapor refrigerant to assure maximum cooling efficiency.

Additionally, the system includes a suction throttling valve attached to the evaporator outlet pipe to throttle the flow of refrigerant from the evaporator back to the inlet of the compressor to maintain a constant pressure in the evaporator core which will maintain the temperature of the evaporator tubes and fins at approximately 32° F. In such systems, the throttling valve is controlled by opposing pressure forces on a throttling piston including evaporator pressure on one side of the piston which is opposed by a spring pressure and a bellows control pressure on the other side.

More particularly, when the evaporator pressure rises above the control pressure it acts against the piston and flows through a small bleedhole in the piston to a bellows chamber. A bellows operated pilot needle valve then opens and closes to maintain the desired control pressure on the piston. When the evaporator pressure overcomes both the spring pressure and the control pressure, the piston is opened until a balance position is reached, at which point the evaporator pressure returns to a desired constant level to produce the desired 32° F. operating temperature.

When the evaporator pressure is below the desired constant pressure control point, the spring pressure on the piston causes the piston to close down to reduce return flow from the evaporator back to the inlet of the compressor until the evaporator pressure rises back to the desired control point.

The expansion valve of the system is hence dependent upon an equalizer or pressure line coupled to the throttling valve. Additionally, the suction throttling valve includes many separate mechanical components to maintain the constant pressure condition in the evaporator.

It is an object of the present invention to eliminate the need for an exposed pressure equalizer line between the expansion valve and throttling valve of an automotive air conditioning control system by the provision of an expansion valve including a flow restriction element and transducer means for converting an electrical signal into mechanical movement of the flow restriction means to regulate flow of liquid refrigerant from the receiver into the evaporator and wherein the transducer means are controlled by static, temperature sensing devices responsive to temperature at the outlet pipe of the evaporator and a reference point in the system to produced first and second electrical signals combined as an equivalent input to a control module which produces an output signal that will condition the valve controlling transducer means to regulate flow of liquid refrigerant into the evaporator completely independently of any pressure signal and in quantities differences in the speed of operation of the automotive compressor.

Still another object of the present invention is to maintain the evaporator core of an automotive air conditioning system with an optimum level of liquid refrigerant therein and at a pressure which prevents ice buildup on the evaporator core and to do so without the need for pressure taps into the refrigerant system by the provision of an expansion valve having a flow restrictor element therein and transducer means for converting electrical energy into movement of the valving element and a suction throttling valve that has a movable throttling member for regulating the flow of return refrigerant from the output pipe of the evaporator back to the compressor and transducer means in the throttling valve that convert electrical energy into movement of the throttling valve and wherein a combined control package is provided including first and second temperature sensors for generating electrical signals in accordance with a reference point in the system and the temperature of the outlet pipe from the evaporator and wherein the electrical signals from the first and second temperature sensors are combined to regulate the energization of the transducer of the expansion valve to maintain an optimum level of liquid refrigerant in the evaporator and wherein a third temperature sensor detects the temperature of the output pipe from the evaporator to control the transducer means of the throttling valve in accordance with the evaporator output pipe temperature to position a throttling element of the suction evaporator to prevent frost buildup thereon during system operation.

In one working embodiment of the present invention these and other objects of the present invention are obtained in an automotive air conditioning system which includes a compressor driven by a belt from the crankshaft pulley of an automobile engine. The system includes six major components interconnected by rubber hose and metal tubing including the compressor, the condenser, a receiver dehydrator, an expansion valve, an evaporator core and the suction throttling valve. The compressor is driven through a magnetic clutch which is conditioned to couple the drive shaft of a compressor to the crankshaft pulley when the air conditioning system of the automobile is on. The speed of the compressor will vary with engine speed when the air conditioning system is on to cause the circulation of refrigerant to vary within the system.

Additionally, the system is subjected to a wide ranged of ambient conditions during its operation. An expansion valve is located to control the amount of liquid flowing from the receiver to the evaporator core and it includes a fixed orifice plate and a movable control slide which is biased into an open position by a balance spring and operated into a flow restricting control position with respect to openings in the orifice disc by means of a transducer which converts electrical energy into movement of the control slide. More particularly, in the illustrated arrangement the transducer is an electromagnetic coil which is connected across a solid-state control module that includes temperature sensing elements responsive to temperatures at different points in the system to change the energization of the magnetic coil. More particularly, the control module includes first and second temperature responsive resistance elements or thermistors, one of which is adapted to sense the temperature of the output pipe from the evaporator core and the other which senses a reference temperature point in the system to provide an equivalent electrical resistance in the circuit which establishes the amount of current flowing through the coil so as to position the slide control element with respect to openings through the orifice plate to produce a metered flow of refrigerant solely in response to temperature signals to keep the core of the evaporator full of liquid refrigerant to assure maximum cooling efficiency.

Additionally, this system includes a suction throttling valve having a movable piston orifice cylinder with a plurality of openings therein operatively connected to an electromagnetic coil and a balance spring that positions the orifice cylinder in an axial relationship with a perforated control cylinder to cause a greater or lesser overlap between openings in the control cylinder and the orifice cylinder to throttle flow from the outlet pipe of the evaporator core back to the inlet of the compressor and to do so by means including a solid-state current control device which includes a temperature responsive resistance that senses the temperature of the output pipe from the evaporator to produce a control signal for varying the current flow to the magnetic coil of the throttling control valve so as to maintain a control throttling of return refrigerant back to the compressor which results in a constant pressure in the evaporator to maintain the evaporator tubes and fins at a temperature at or near freezing to prevent a buildup of ice on the evaporator core that might block air flow into the passenger compartment.

Further objects and advantages of the present invention will be apparent from the following description, reference being had to the accompanying drawings wherein a preferred embodiment of the present invention is clearly shown.

IN THE DRAWINGS

Figure 1:
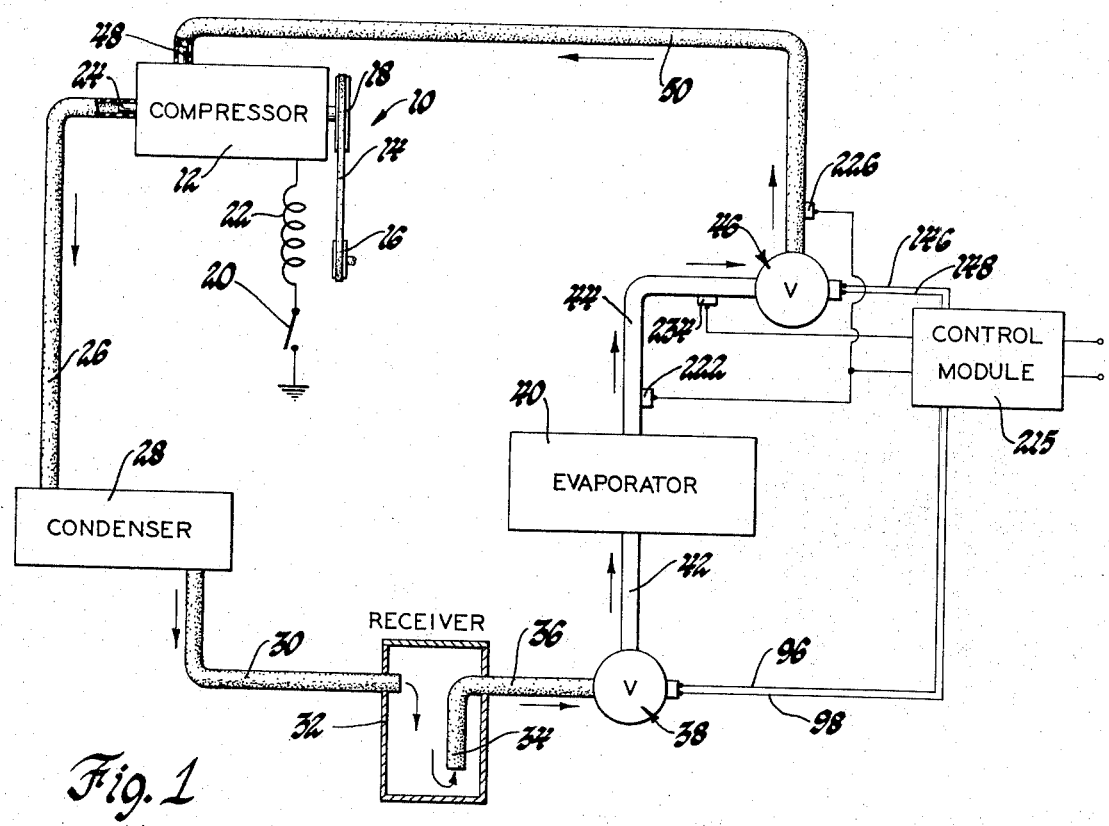
FIG. 1 is a diagrammatic view of a refrigeration system for use in a vehicle air conditioning unit for cooling air directed into the passenger compartment of an automobile.

Referring now to the drawings, in FIG. 1 an automobile refrigeration system 10 is illustrated which includes a compressor 12 which is adapted to be driven by a belt 14 from a crankshaft pulley 16 on the automobile engine. The belt 14 passes over a clutch pulley 18 which is coupled to the compressor shaft by magnetic forces generated when an air conditioning switch 20 is closed to complete an energization circuit through a clutch coil 22 from the automobile battery to ground.

The compressor 12 includes an outlet 24 which is connected through a rubber hose 26 to the inlet of an aluminum tube and fin heat transfer unit 28. This unit is normally located directly forward of the radiator of the car and functions to transfer heat from the refrigerant flowing through the system 10 to the air stream drawn through it by the automobile engine fan.

The condenser 28 is connected through a hose 30 to the inlet of a receiver hydrator assembly 32.

These units are commonly in the form of an aluminum tank having a pickup tube 34 which extends to the bottom of the tank where liquid refrigerant is directed from the receiver through a receiver outlet into a hose 36 which connects to the inlet of an improved expansion valve assembly 38 which is operated solely in response to temperature differences in the system to meter the flow of refrigerant from the pickup tube 34 to an evaporator assembly 40 to keep the core of the evaporator assembly 40 full of liquid refrigerant so as to produce an operation with maximum cooling efficiency.

The evaporator 40 includes a refrigerant tube and fins thereon which are located in a duct system (not shown) including a blower which draws air from air inlets in the system and forces it through the evaporator core where it is cooled and dehumidified. The air is then transferred into the passenger compartment for circulation therein during air conditioner operation.

The evaporator has an inlet pipe 42 thereon which is connected to the outlet of the expansion valve 38 and it also includes an outlet pipe 44 which is connected to the inlet of a refrigerant throttling valve 46 whose function to throttle the flow of refrigerant from the evaporator to the inlet 48 of the compressor through a return hose 50.

The throttling is done so that a constant pressure of 29.5 psi plus or minus 0.5 psi is maintained in the core of the evaporator. At this pressure the temperature of the fin and tube portions of the evaporator core are maintained near or at 32° F. and as a result there is no buildup of ice on the evaporator that can block air flow thereacross. This assures continued circulation of cooled air into the passenger compartment.

In accordance with certain principles of the present invention the throttling valve 46 is operated to maintain the constant pressure solely in response to the temperature conditions in the refrigerant flow portion of the system.

Moreover, the operation of the evaporator valve in this system is not dependent upon the provision of an easily damaged small diameter pressure equalizer line between the throttling valve and the expansion valve portions of the system.

Figure 2:
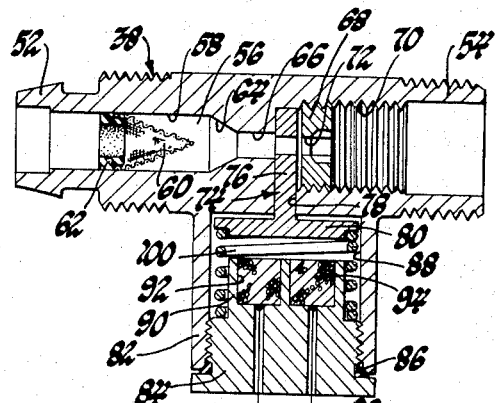
FIG. 2 is a vertical sectional view of a flow controlling, electronically operated expansion valve in the system of FIG. 1.

The expansion valve 38, best shown in FIG. 2, is an electrically controlled device which regulates the cooling capacity of the evaporator core 40 by metering liquid from the pickup tube 34 in the liquid-filled bottom of the receiver to the inlet pipe 42 of the evaporator. More particularly, it includes an inlet 52 adapted to be connected to one end of the liquid line or hose 36 and an outlet 54 that is adapted to be connected to the fitting between the expansion valve and the inlet pipe 42 on the evaporator. Between the inlet 52 and outlet 54 is located a flow passageway 56 including a large diameter inlet section 58 in which is located a conical inlet screen 60 that has an open base portion thereon fit over one end of an annular screen support retainer member 62 which has the outer periphery thereof press fit within the inlet section 58.

The tip of the conical screen 60 is located upstream of a tapered transition 64 which communicates the flow section 58 with a small diameter section 55 of the passageway 56 which leads to the inlet side of an opening through an orifice disc 68 which is threadably supported in one end of an internally threaded section 70 of passageway 56.

The orifice disc has a predetermined sized opening 72 located centrally thereof which has a smaller diameter on the upstream side and a larger diameter on the downstream side to produce a control pressure differential across the disc 68.

In accordance with certain principles of the present invention, this pressure differential is regulated by means including a control slide element 74 which includes an upper portion 76 slidably supported within a transverse groove 78 in the valve housing which intersects the flow passageway 56 at the small diameter section 66 therein.

The element 74 further includes a base portion 80 that is located in a cylindrical extension 82 formed on one side of the valve housing.

A threaded plug 84 is threadably received in a threaded open end of the extension 82 and an O-ring gasket 86 is located between the plug 84 and the extension 82 to define a sealed chamber 88 in which is located a transducer for converting electrical energy into motion of the control slide element 74.

More particularly, the plug 84 has a small diameter end portion 90 thereon which extends upwardly within the chamber 88 in spaced relationship to the inside walls of the cylindrical extension 82. A groove 92 in plug 84 has an electromagnetic coil 94 located therein.

The electromagnetic coil 94 is thus supported in close spaced relationship to the base portion 80 of the slide element 74. The base portion 80 is responsive to variations in current through the coil 94. The current occurs across leads 96, 98 connected to a source of coil current.

The transducer additionally includes a balance spring 100 which has one end thereof in engagement with the outer peripheral edge of the base portion 80 and the opposite end thereof supported on the lug 84 in surrounding relationship to the end 90 thereon.

Figure 3:
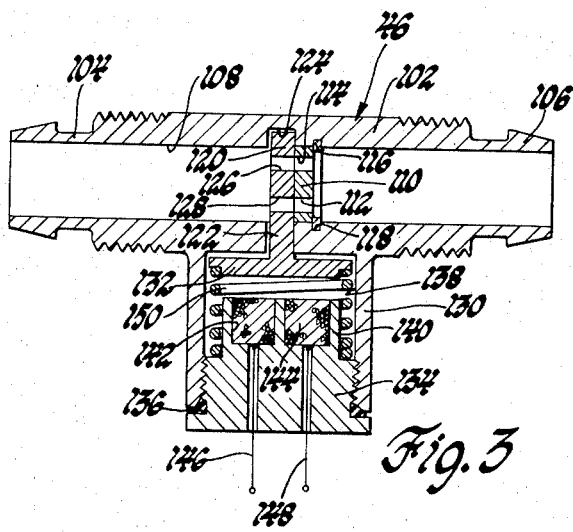
FIG. 3 is a vertical sectional view of an electrically controlled suction throttling valve for throttling the flow of refrigerant from the evaporator back to the compressor to maintain a constant pressure within the evaporator core.

The refrigerant throttling valve 46, best shown in FIG. 3, has somewhat the same configuration as the electromagnetically controlled expansion valve 38 and differs from prior suction throttling valves in like automotive air conditioning systems by the provision of a single moving control element which can be operated by transducer means for converting a variable electrical signal into mechanical movement thereof.

More particularly, the throttling valve 46 includes a housing 102 having an inlet 104 thereon adapted to be connected to a fitting to the outlet pipe 44 of the evaporator core 40 and an outlet 106 which is adapted to be connected to the suction line or hose 50 for returning refrigerant gas from the throttling valve 46 to the inlet 48 of the compressor.

The inlets and outlets 104, 106 are communicated by a flow passageway 108 having a uniform diameter therethrough.

Approximately midway between the inlet 104 and outlet 106 is located an orifice disc 110 having a plurality of control openings 112, 114 therethrough.

The disc 110 is held in place by means of a retaining ring 116 which snap fits within a groove 118 in the housing 102. The disc 110 is held against one side of the upper portion 120 of a control slide element 122.

More particularly, the upper portion 120 is slidably received in a transverse groove 124 in the housing 102 which intersects the passageway 108 therein.

Flow passageways 126, 128 in the upper portion 120 of the control slide 122 are located in a greater or lesser overlapping axial relationship with the orifice openings 112, 114 to vary the pressure controlling effect of the orifice disc 110. This maintains a desired throttling of return flow from the evaporator core 40 to the inlet 48 of the compressor to produce a constant pressure at the evaporator core to prevent buildup of ice on the fins and coils thereof during system operation.

The throttling valve 46 includes a cylindrical, tubular extension 130 on one side thereof in which is located a base 132 of the control slide 122. A plug 134 is threadably received in the opened end of the cylindrical extension 130 and an annular 0-ring 136 is located between the plug 134 and the end of the extension 130 to seal a transducer chamber 138 formed by the plug 134 and extension 130.

The plug 135 has a small diameter end 140 thereon which is located in spaced relationship to the inside walls of the cylindrical extension 130. Further, it includes a groove 142 on the upper end thereof in which is located an electromagnetic coil 144.

The arrangement locates the coil 144 in close spaced relationship to the face of the base portion 132. A variable current source connected across the leads 146, 148 of the coil 144 will cause an electromagnetically induced positioning of the slide control 122 against the balancing force of a balance spring 150. One end of spring 150 is in engagement with the base portion 132 and the opposite end thereof is supported by the plug around the small diameter end 140 thereon.

In accordance with certain principles of the present invention, the simplified expansion and throttling valves in FIGS. 2 and 3 are controlled solely in response to changes in temperatures of the inlet and outlet pipes of various segments of the system rather than in response to changes in pressure conditions within the system.

This eliminates an easily damaged, small diameter equalizer line running from the suction throttling valve on the evaporator to the expansion valve thereon. Additionally, it eliminates the need for bellows operators in the suction valve of the type presently found in systems for controlling pressure in an evaporator core of an automotive system.

Figure 4:
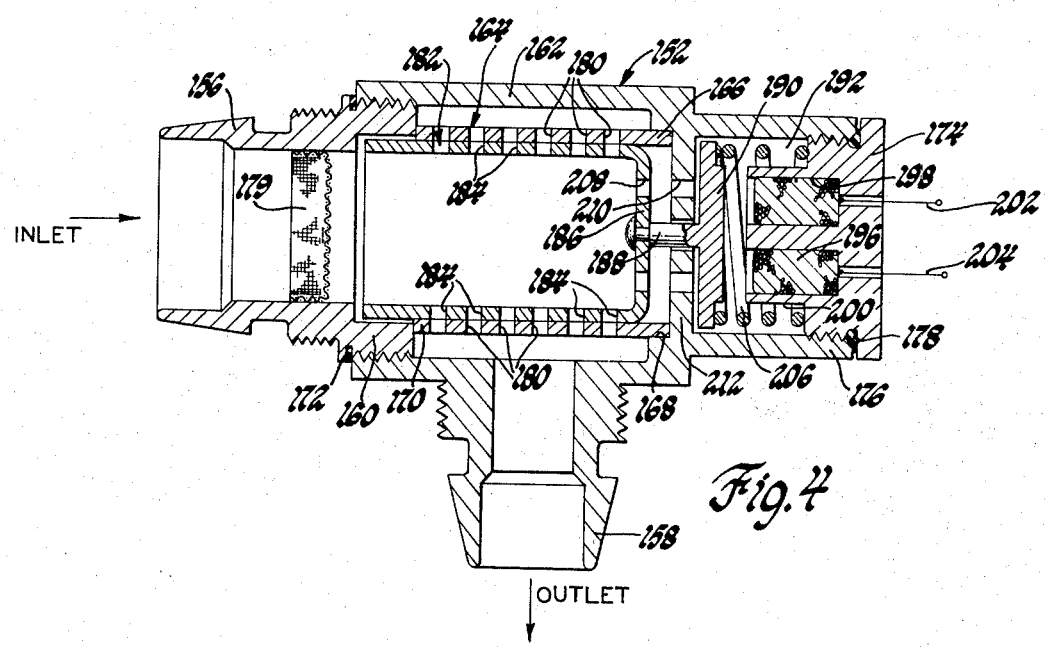
FIG. 4 is a vertical sectional view of another embodiment of a suction throttling valve serving the same purpose as that of FIG. 3.
Figure 5:
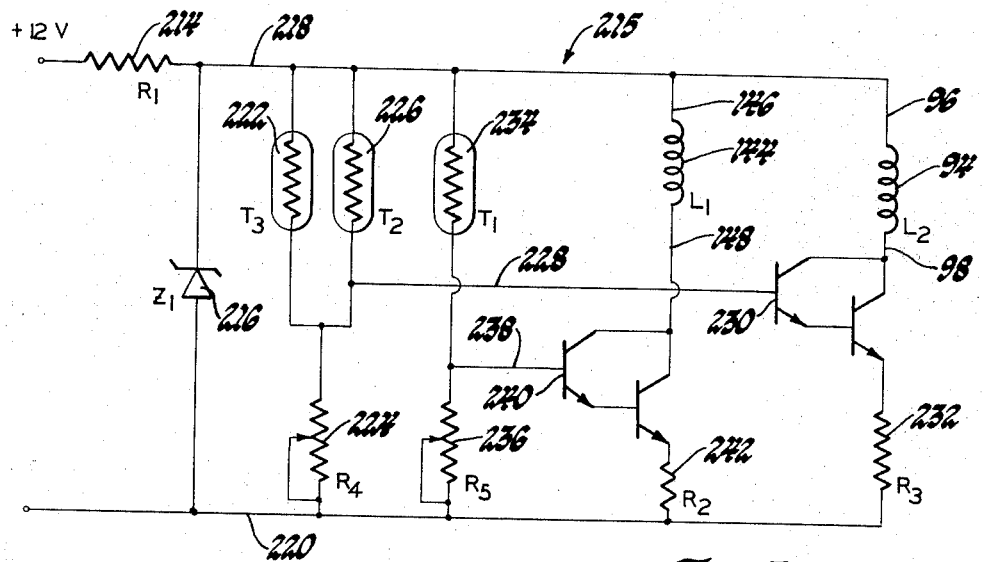
FIG. 5 is a schematic circuit showing the controls for regulating operation of the expansion and throttling valves in the system of FIG. 1.

In FIG. 4, another embodiment of a suction throttling valve is illustrated which can be included in the system 10 to perform a function similar to that of valve 46.

More particularly, the valve 152 in FIG. 4 includes an inlet 156 which is adapted to be connected to the outlet pipe 44 of the evaporator and an outlet 158 which is located in a right angle relationship with the inlet 156 on the housing of the valve 152. It is adapted to be connected by the suction line 50 back to the inlet 48 of the compressor.

The inlet 156 includes a threaded open end 160 thereon threadably received in a tubular housing portion 162 of the valve 152 in which the outlet fitting 158 is formed. The tubular housing 162 has a control cylinder 164 supported throughout the length thereof. More particularly, the control cylinder 164 includes one end 166 thereon seated in press fit relationship with an inside diameter portion 168 at one end of the tubular housing 162, an opposite end 170 thereon engages threaded end 160. The inlet fitting 156 secures the control cylinder 164 in place.

A sealing gasket 172 is located between the inlet fitting 156 and the end of the tubular housing 162 to seal one end of the valve 152. A plug 174 is threadably received in a transducer extension 176 on the opposite end of the housing 162 and an annular gasket 178 between the plug 174 and the extension 176 seals the opposite end of the valve. An inlet screen 180 is seated within the inlet fitting 156 immediately upstream of the control cylinder 164.

The control cylinder 164 is like the orifice disc of the previous embodiment in that it includes a plurality of small control openings 180 therethrough which are maintained in a fixed relationship with respect to the housing of the valve 152.

Within the control cylinder 164 is located a movable orifice cylinder 182 which is supported in sliding relationship with the walls of the orifice cylinder 180 for relative axial movement therein.

Thus, a plurality of orifice openings 184 through the orifice cylinder 182 are either aligned or misaligned with flow ports 180 through the control cylinder thereby to vary the amount of throttling between the inlet and outlet of the valve 152.

More particularly, the control cylinder includes a base 186 thereon which is secured to one end of a pin 88 which has a disc portion 190 thereon located within a sealed control chamber 192 formed between the plug 174 and the extension 176.

As was the case with prior embodiments, the disc 190 is operatively associated with an electromagnetic coil 196 formed in a groove 198 in the top of a small diameter end portion 200 on the plug 174. Coil 196 is located in spaced relationship to the inside wall of the extension 176 and in close space relationship to the disc portion 190 whereby a variable current across leads 202, 204 of the coil 196 will cause axial movement of the disc portion 190 within the control chamber 192 so as to cause a greater or lesser mismatch between the orifice openings 184 and the flow ports 180 against the return force of a balance spring 206 which has one end thereof in engagement with the base portion 190 and the opposite end thereof carried by the plug 174.

In order to provide for free axial movement of the orifice cylinder 182 within the control 164, the base 186 includes a plurality of relief openings 208 therein. Likewise, to provide for free movement of the base portion 190 relief openings 210 are formed in a partition 212 which supports the pin 188 during its axial movement.

As illustrated in FIG. 1, the system valve is regulated by a control module which in accordance with certain other principles of the present invention is characterized as including only solid-state electrical control components for producing variable currents in response to temperature changes at the input and output pipes of the system.

A control module 215 in FIG. 4 includes components that are operative to produce accurate changes in current across the coils of the transducer portion of the control valve components of the system quickly in response to changes in the temperature at the pipe portions of the system.

More particularly, the circuit includes a resister 214 and a Zener diode 216 connected between conductors 218 and 220 to produce a voltage regulator function in the circuit.

The control for current across the expansion valve coil 94 includes a thermistor 222 which is located in heat transfer relationship with the outlet pipe from the evaporator. It has one terminal thereon connected to the conductor 218 and another terminal thereon connected to a lead of a potentiometer 224 connected between the thermistor 222 and the conductor 220 for adjusting the refrigerant metering action of the expansion valve 46.

Additionally, the current control for the coil 94 includes a second thermistor 226 which has one of its terminals electrically connected to the conductor 218 in parallel with the thermistor 222 to a conductor 228 which electrically connects to the base of a Darlington amplifier 230.

The thermistor 226 is located in heat transfer relationship with the outlet of the throttling valve 46 whereby control of the coil 94 will be in part dependent upon the action of the throttling valve. The expansion valve 38 thereby regulates liquid flow of refrigerant from the receiver to the evaporator core to maintain the level of coolant in the evaporator which will reduce the temperature of air flowing thereacross. The valve 46 will maintain the evaporator temperature at or near 32° F. to prevent the buildup of ice thereon.

The thermistors 222, 226 are temperature responsive resistors whose valve changes markedly in response to the temperature of exposed outer surfaces in the pipes and conduits in the system. For purposes of understanding this aspect of the control, it should be noted that the compressor 12 discharges high temperature, high pressure vapor that contains heat absorbed in the evaporator plus heat imparted to it by the compressor in the compression process. This high pressure heated vapor flows through parallel tubes in the condenser 28 where it releases heat to the outside air stream to change the vapor to a medium temperature high pressure liquid. This liquid flows to the receiver 32 from whence it flows through the pickup tube 34 and through the liquid line or hose 36 to the expansion valve inlet 52. The relationship between the movable slide control 74 and the orifice disc opening 70 will determine flow through the valve 38 into the evaporator. At the orifice disc 68 the medium temperature high pressure liquid changes to a low temperature, low pressure liquid and vapor mixture. This cold, foamy mixture enters the evaporator core at the bottom end and flows through parallel tubes upward through the core of the evaporator. Heat from the warm airstream passing through the core prior to being cooled and passing through the passenger compartment, is transferred to the refrigerant to vaporize the liquid. Under high load conditions (a very high outside ambient temperature) all the liquid is vaporized in the evaporator and only vapor flows through the suction throttling valve 46 and the suction line 50 to the compressor inlet 48. Under this maximum heat load condition, the heated refrigerant vapor is drawn into the compressor to be increased in temperature and the cycle is then repeated. The outlet pipe 44 of the evaporator is an exposed aluminum surface which reflects the temperature of refrigerant passing from the evaporator and the resistor 222 immediately responds to the actual temperature condition of refrigerant at this point in the system to produce a first electrical signal.

In order to reflect the condition of the system at the throttling valve 46 the electrical signal produced by the thermistor 226 is combined with that of the resistance 222 to produce an equivalent resistance that is temperature dependent, in one instance to the temperature of refrigerant at the evaporator output and in another instance to the temperature of the refrigerant vapor passing from the throttling valve 46. By provision of this arrangement, the system will respond to prevent the suction pressure of the compressor from dropping below a predetermined point when the compressor capacity becomes greater than the heat load on the evaporator.

Under these circumstances the expansion valve 38 will meter only a small amount of liquid refrigerant into the evaporator. This eventually will be reflected in an increase in the temperature of the vapor passing from the throttling valve 46 and when the evaporator is subject to only a light load eventually the temperature of the refrigerant at the outlet of the throttling valve will produce a resistance in thermistor 226 to modify the equivalent resistance of thermistors 222, 226 to allow a predetermined minimum amount of liquid refrigerant flow through the evaporator core to maintain a certain minimum suction pressure at the compressor and thence a lubricating flow of refrigerant through the compressor.

In order to accomplish this, the equivalent resistance of the thermistors 222, 226 is directed by the conductor 228 to the base of the amplifier 230 to vary the conductivity between the collector and emitter of a pair of transistors which are electrically connected in series with the coil 94 and a current limiting resistor 232 across conductors 218, 220.

The equivalent resistance of the thermistors 222, 226 acts in conjunction with the expansion valve potentiometer resistance 224 to form a voltage divider which maintain a variable control voltage on the base of amplifier 230. The voltage drop across the base emitter junction of the transistors in the amplifier 230 is always approximately 1.2 volts. This establishes a fixed voltage at the junction of the emitter and the resistor 232. The collector current through the coil 94 varies by changing the voltage at the base of the Darlington amplifier 230. By controlling this current in response to the temperature sensed by thermistors 222, 226 a variable force is exerted on the control slide 74 to move it against the force of the balance spring 100 until the control device reaches a balanced point which allows a predetermined metering of liquid refrigerant into the evaporator to satisfy the heat load on the evaporator. It also maintains a minimum suction pressure at the compressor to assure refrigerant flow for lubricant purposes.

The electronically controlled suction throttling valve aspect of the circuit in FIG. 4 includes a thermistor 235 which is located in heat transfer relationship with the outer surface of the aluminum outlet pipe 44 of the evaporator. This thermistor 234 is associated with a throttling valve adjusting potentiometer 236 across the conductors 118, 220 to define a voltage divider connected to a conductor 238 which applies a control voltage to the base of a Darlington amplifier 240 which controls the amount of current through the magnetic coil 144 of the suction throttling valve 46.

The energization circuit for the coil 144 is across the resistance 214 thence through the coil 144 and the collector and emitter of the Darlington amplifier 240 and through a voltage limiting resistor 242 which is electrically connected to the conductor 220.

In operation, when the thermistor 234 senses a change in temperature at the evaporator outlet, the change in the resistance resulting therefrom will produce a changed voltage at the base of the amplifier 240 because of the voltage dividing function of the thermistor 234 and potentiometer 236. This will result in a change in collector current of the amplifier 240 and a concurrent proportional change in the current across the leads of the coil 144.

This change in current causes a variable magnetic force to be exerted on the control slide 120 of the suction throttling valve and this magnetic force is balanced at a new position by the spring 150 to throttle the return of vapor flow from the evaporator back to the compressor to a point where a constant pressure will be maintained in the evaporator core at a level to prevent buildup of ice on the fins and tubes of the core that might block the passage of air over the evaporator core into the passenger compartment. The operation of the throttling valve is preset by adjusting the position of the potentiometer 236 to maintain a reference voltage on the amplifier 240. The control slide 120 will move the openings 126, 128 into a greater or lesser degree overlying relationship with the openings 112, 114 in the orifice disc 120 to control the amount of throttling across the valve.

The operation of the suction throttling valve of FIG. 4 is like that of the suction throttling valve of FIG. 3 except that in this case, the sleeve portion of the orifice cylinder 182 is moved axially with respect to the flow ports 180 in the control cylinder 164 to obtain the throttling control.

A typical system utilizing the present invention would include components having the following mechanical and electrical ratings.

| Component | Rating |
| --- | --- |
| Compressor 12 | 12.6 cub. in.displacement |
| Compressor clutch coil 22 | 4.0 ohms |
| System refrigerant | 4.0 lbs. (Dichlorodifluoromethane) |
| Coil 94 | 2.5 ohms |
| Coil 144 | 2.5 ohms |
| Thermistor 222 | 2K$\Omega$ (+) coef. |
| Thermistor 226 | 2K$\Omega$ (+) coef. |
| Thermistor 234 | 1K$\Omega$ (+) coef. |
| Amplifier 230 | RCA 2N5490 & Motorola 2N5089 |
| Amplifier 240 | RCA 2N5490 & Motorola 2N5089 |
| Spring 100 | 20. lbs./inch |
| Spring 150 | 20. lbs./inch |

The operation of refrigerant systems is accomplished by means of substantially static components and simplified valve arrangements. They maintain a metered flow of liquid into the evaporator 40 that will assure both maximum cooling efficiency and lubrication of the compressor without the need for an easily damaged small diameter pressure equalizing tube in the system between the suction throttling valve and the expansion valve. Furthermore, pressure control in the core to prevent ice buildup is maintained without the need for pressure responsive components in the system.

While the embodiments of the present invention, as herein disclosed, constitute a preferred form, it is to be understood that other forms might be adopted.

What is claimed is as follows:

1. In an automotive air conditioning system the combination of; a compressor having an inlet and an outlet, means including a condenser and a liquid refrigerant receiver defining a high pressure refrigerant path connected to said compressor outlet, means including an evaporator defining a low pressure refrigerant path connected to said compressor inlet, an expansion valve connected between said receiver and said evaporator including control slide and an orifice disc, a transducer for converting electrical energy into mechanical movement of said control slide relative to said orifice disc to control the flow of refrigerant from the said liquid receiver to said evaporator, a suction throttling valve located between the outlet of said evaporator including a movable throttle member and transducer means for converting an electrical signal into mechanical motion of said throttle member to control flow of refrigerant from said evaporator to said compressor so as to maintain a constant pressure therein to prevent ice formation on the evaporator that could block air flow across the evaporator into the passenger compartment of the automobile, means including a first thermistor sensing the evaporator outlet temperature and producing a first variable resistance dependent upon the temperature of the evaporator outlet, a second thermistor sensing the temperature of refrigerant between the outlet of said throttling valve and the inlet of said compressor for producing a second electrical signal in response thereto, a circuit including first and second three-terminal, solid-state amplifier devices, means for directing said first and second electrical signals to one terminal of one of said devices, means for connecting said expansion valve transducer in circuit with second and third terminals of one of said device, said first and second signals from said thermistors varying the conductivity of said one of said three-terminal solid-state amplifier devices to vary the current through said expansion valve transducer for controlling the position of said orifice disc to vary the amount of refrigerant flow from said receiver to said evaporator, a third thermistor sensing the evaporator outlet temperature and producing a third electrical signal, means for directing said third signal to one terminal of the other of said amplifier devices, means for connecting said throttling valve transducer in circuit with second and third terminals of the other of said amplifier devices, said third signal varying the conductivity of said other of said amplifier devices to vary the current through said throttling valve transducer to control the portion of said throttle member thereby to maintain a constant pressure in said evaporator.

2. In a control system for regulating the flow of liquid refrigerant through an automotive refrigerant system of the type including a compressor, high pressure liquid receiver, a refrigerant condenser, and means for controlling flow of liquid refrigerant through an evaporator, the improvement comprising: an expansion valve having an inlet adapted to be connected to the liquid receiver and an outlet adapted to be connected to the inlet of the evaporator, an orifice disc fixedly secured in said valve including an opening therethrough between said inlet and said outlet, a control slide supported in sliding relationship with said orifice disc and including an opening therein adapted to be moved in greater or lesser overlying relationship with the opening in said orifice disc, a balance spring engaging said base and biasing said control slide to locate the opening therethrough in concentric relationship with the opening through said orifice disc to allow unrestricted flow of liquid refrigerant from the inlet of said expansion valve to the outlet thereof, said control slide base serving as an armature movable in response to a magnetic field, an electromagnetic coil including first and second electrical terminals, a control circuit for varying current flow across said terminals including a thermistor for sensing the temperature of refrigerant flowing from the outlet of the evaporator and operative to produce an electrical signal, means connected between first and second terminals of said coil including a three-terminal, solid-state control device having first and second terminals thereof connected in electrical circuit with said coil, means for directing the electrical signal from said thermistor to the third terminal of said device to control current flow across the other terminals of said device to vary energization of said coil, said control current through said coil exerting a magnetic force on the base portion of said control slide to move it against said spring to a balance position wherein the opening through said slide is offset form the opening through said control orifice disc thereby to control refrigerant flow from the inlet to the outlet of said expansion valve in accordance with the outlet temperature of said evaporator to maintain said evaporator full of low pressure liquid to assure maximum cooling efficiency.

3. In a control system for an automotive refrigerant system of the type including a continuously operated compressor with an outlet discharging high pressure refrigerant through a condenser for condensation and collection in a receiver and a compressor inlet drawing low pressure refrigerant gas from the outlet of an air cooling evaporator the improvement comprising: expansion valve means between the liquid receiver and the inlet of the evaporator including an orifice control element and a transducer for converting electrical energy into movement of the orifice control element to vary the flow of liquid refrigerant into the evaporator so as to maintain the evaporator full of low pressure liquid to obtain maximum cooling efficiency therefrom, a throttling valve located between the outlet of the evaporator and the inlet of the compressor including an orifice element for throttling the flow of refrigerant from the outlet of said evaporator to the inlet of the compressor, transducer means for converting electrical energy to movement of the orifice element, a first thermistor sensing the temperature of the outlet of said evaporator for producing a first electrical signal in accordance with the temperature of refrigerant passing from said evaporator, a second thermistor for producing a second electrical signal responsive to the temperature of refrigerant between the outlet of the throttling valve and the inlet of the compressor, means for regulating energization of said expansion valve transducer in accordance with the combined signals of said first and second thermistors to maintain the evaporator full of low pressure liquid refrigerant to produce maximum cooling efficiency, a third thermistor for sensing the temperature of the refrigerant between the outlet of the evaporator and the inlet to the throttling valve for producing a third electrical signal and means for controlling the transducer means of said throttling valve in response to the electrical signal from said third thermistor to maintain the throttling of refrigerant return from said evaporator to the compressor so as to produce a pressure condition within said evaporator to prevent water from freezing on said evaporator during continuous operation of said compressor.

4. A controller for regulating the amount of refrigerant flowing to the inlet of an evaporator and from the outlet of the evaporator to maintain maximum cooling efficiency in an automotive refrigerant system of type including a compressor discharging hot refrigerant gas into a condenser for cooling and liquification thereof and a receiver for receiving liquid from the condenser for discharge to the evaporator and wherein the inlet of the compressor is connected to the outlet of the evaporator for return of expanded gases therefrom comprising in combination: an expansion valve including an orifice member between the inlet and outlet thereof, a movable valve operatively associated with the orifice member to vary the amount of liquid flow across the expansion valve into the inlet of the evaporator, a transducer for causing movement of the valve including an armature piece and an energizable electromagnetic coil, means for varying the energization of said coil in response to a combination of the temperature of refrigerant flowing from the evaporator and the temperature of refrigerant gases returning to the compressor to locate the valve with respect to the orifice member to allow sufficient liquid flow into the evaporator to maintain it full of liquid and at a maximum refrigerating efficiency, a throttling valve located between the outlet of the evaporator and the compressor including a movable valving component for throttling the return flow of refrigerant from the evaporator to the compressor, a transducer for converting electrical energy to mechanical movement of the valving component, and means for varying the electrical energization of said transducer including means responsive to the outlet temperature of refrigerant flowing from the evaporator to the inlet of the suction throttling valve to control the position of said valving component so as to maintain a constant control pressure at the evaporator to prevent buildup of ice on the evaporator capable of impeding flow of air across the evaporator into the passenger compartment of the vehicle.

5. An automobile air conditioning system comprising: a compressor having an inlet and outlet, means for continuously operating the compressor when the air conditioning system of the car is on, a condenser for receiving high pressure refrigerant gas from the compressor outlet and condensing it to a liquid, a receiver for collecting said liquid, an evaporator for cooling air entering the passenger compartment of the automobile, a high pressure pickup tube from said receiver, means including an expansion valve for connecting said pickup tube to said evaporator, said valve including a movable valving component for varying the amount of liquid flow from the receiver to the evaporator, said expansion valve including transducer means for converting electrical energy into movement of the valving component, a low pressure line connecting the outlet of the evaporator to the inlet of the compressor, a throttling valve in said low pressure line including a movable valve element for throttling flow of refrigerant gas from the outlet of the evaporator back to the compressor to maintain a predetermined control pressure at the outlet of the evaporator during continuous operation of the compressor and in response to changes in the heat load on the evaporator thereby to maintain the temperature of the evaporator near freezing to prevent buildup of ice thereon that would block flow of air thereacross into the passenger compartment, said throttling valve including transducer means for converting electrical energy into movement of the throttling valve element, first, second and third thermistor means for sensing the temperature of liquid refrigerant from the evaporator and the temperature of return gas from the throttling control valve to the compressor, first control means for converting electrical signals from first and second of said thermistor means to vary the energization of said expansion valve transducer means to locate said expansion valving component so as to vary liquid flow to the evaporator to maintain it full of low pressure liquid refrigerant during continuous operation of the condenser and changes in heat load on the evaporator, and second control means for varying the energization of the transducer means of said throttling valve in accordance with the electrical signal of the remaining thermistor means to locate the throttling valve element at a position to maintain the desired predetermined constant pressure within said evaporator during changes of heat load thereon.

* * * * *